March 26, 1929. T. E. MURRAY 1,706,703
METHOD OF PRODUCTION OF TURBINE BLADES
Filed April 20, 1923
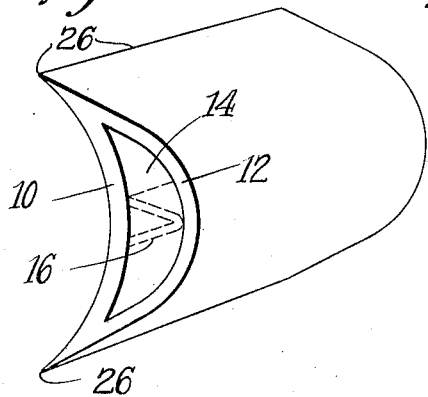
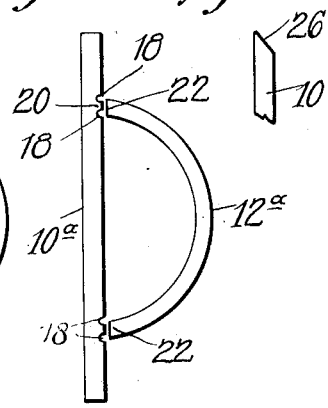
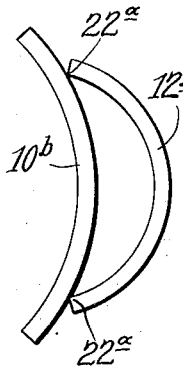
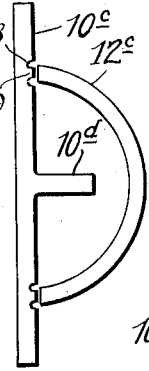
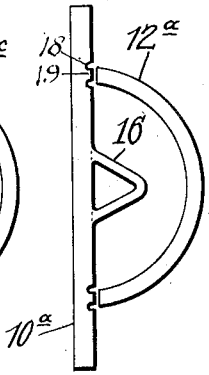
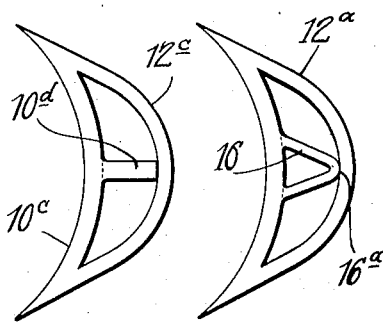
Inventor
Thomas E. Murray.
By His Attorney Patented Mar. 26, 1929.

1,706,703

UNITED STATES PATENT OFFICE.

THOMAS E. MURRAY, OF BROOKLYN, NEW YORK.

METHOD OF PRODUCTION OF TURBINE BLADES.

Application filed April 20, 1923. Serial No. 633,409.

This invention relates to improvements in the method of manufacturing turbine blades. I provide a blade which can be constructed of two or more plates suitably united to form a unitary element.

The accompanying drawings illustrate embodiments of the invention and also different steps in the method of producing the blades.

Fig. 1 is a perspective view of one type of blade embodying my invention and made according to my method.

Fig. 2 is an end view of a blade in the process of formation.

Fig. 3 is a detail showing a step in the method of producing the blade of Fig. 1.

Fig. 3ª is a detail of a plate illustrating a modification.

Fig. 4 is a view showing an alternative step in the method of manufacture.

Figs. 5 and 6 are views illustrating steps in producing blades with interior reinforcements.

Figs. 7 and 8 are detail sections of blades having interior reinforcements secured thereto.

Referring first to Fig. 1, the blade consists of a face plate 10 curved to the desired contour and having secured thereto a back plate 12 bent to a different curvature and spaced therefrom thus forming a chamber 14 as shown. It is apparent that the blade is of hollow formation and hence is of light weight which is advantageous in structures of this kind which rotate at a high rate of speed. If desired I may secure a reinforcement 16 between the plates 10 and 12. The reinforcement may take various forms and can be secured in different ways as will appear hereinafter.

The blade can be conveniently made as illustrated in Figs. 2 and 3 by electrically welding a curved back plate 12ª to a flat face plate 10ª, the flat plate being grooved as at 18 to form a welding projection or rib 20 of somewhat restricted area to form a good welding contact with the edges 22 of the curved plate 12ª.

The plates 10ª and 12ª are welded by passing a current of high amperage and low voltage therethrough. After the plates 10ª and 12ª are united, the structure thus produced can be subjected to pressure in suitable dies and formed to the desired contour in cross-section as illustrated in Fig. 2. The corners 24 can then be machined off to the dotted lines in Fig. 2 so as to form the comparatively sharp edges 26 as in Fig. 1. Instead of cutting off the corners, I may start with a plate which is beveled as at 26 in Fig. 3ª it being possible to subsequently press the plates to the contour shown in Fig. 1. Or after the curved plate 12ª has been united to the flat plate 10ª the unitary piece to be formed may be drop forged to shape it to the desired contour as in Fig. 1, the edges 26 being properly shaped in the forging operation.

As shown in Fig. 4, I may form the blade of two plates 10ᵇ and 12ᵇ which have both been previously bent or arched as will be understood. When formed in this way the corners 22ª of the plate 12ᵇ provide a restricted area for the passage of current when the plates are united by electric welding.

As shown in Fig. 5, I form the blade of two pieces including a flat plate 10ᶜ having an integral reinforcing rib 10ᵈ. To the flat plate I first weld a curved plate 12ᶜ and then subject the united plates to pressure to form them to the desired shape as in Fig. 7. The parts are so proportioned that in the finished article the under surface of the plate 12ᶜ contacts with the longitudinal edge of the rib 10ᵈ. The plate 12ᶜ may be welded or otherwise united to the rib 10ᵈ if required. Instead of forming the rib 10ᵈ integrally with plate 10ᶜ it is understood that I may secure a separate piece to the plate 10ᶜ to form this reinforcement.

In Fig. 6, I have shown a step in the method of producing a blade having a slightly different form of reinforcement. In this case a small angle bar 16 is welded or otherwise secured to the plate 10ª and the curved plate 12ª is welded or otherwise united to the plate 10ª after which the plates are subjected to pressure to form the blade to the contour shown in Fig. 8 in which position the peak 16ª contacts with the undersurface of the arched plate 12ª.

The blades may be made as above described in comparatively great lengths and cut up to form short blades of the required dimensions. My improved blade of hollow formation is an improvement over the solid turbine blades heretofore generally used. The blades can be produced by the method described much more cheaply than solid blades or proposed hollow blades can be made.

Though I have described with great particularity, the construction of the turbine blades illustrated and the steps pursued in manufacturing the same, it is not to be construed that I am limited thereto as variations may be made by those skilled in the art without departing from the invention as defined in the appended claims.

What I claim is:—

1. In the manufacture of turbine blades the method which includes providing an arched back plate and a front plate wide enough to span the edges of the arched back plate and welding said edges to the face of the front plate to form a blade of the required cross-sectional shape.

2. In the manufacture of turbine blades the method which consists in providing an arched back plate and a front plate wide enough to span the edges of the arched back plate, uniting said edges to the front plate and subjecting the united parts to pressure to shape them to the required contour in cross-section.

3. In the manufacture of turbine blades the method which consists in providing an arched back plate and a front plate wide enough to span the edges of the arched back plate, welding said edges to the face of the front plate to form an integral unit of approximately the sectional shape required and then subjecting said unit to pressure to change its sectional contour and finally machining the surface of the blade to give it a smooth finished surface.

4. In the manufacture of turbine blades the method which consists in providing an arched back plate and a front plate wide enough to span the edges of the arched back plate with a reinforcement on the face of the front plate and lying within the arch of the back plate, and welding said edges to the face of the front plate to form a blade of the required cross-sectional shape with an internal reinforcement.

In witness whereof, I have hereunto signed my name.

THOMAS E. MURRAY.